US008616136B2

(12) United States Patent
Burgess et al.

(10) Patent No.: US 8,616,136 B2
(45) Date of Patent: Dec. 31, 2013

(54) KEYBOARD TRAY TILT

(75) Inventors: Roddy Burgess, Charlotte, NC (US); Jacob Connelly, Concord, NC (US); Robert Grant McRorie, Huntersville, NC (US)

(73) Assignee: Rubbermaid Incorporated, Huntersville, NC (US)

( * ) Notice: Subject to any disclaimer, the term of this patent is extended or adjusted under 35 U.S.C. 154(b) by 351 days.

(21) Appl. No.: 13/016,377

(22) Filed: Jan. 28, 2011

(65) Prior Publication Data

US 2011/0235250 A1  Sep. 29, 2011

Related U.S. Application Data

(60) Provisional application No. 61/299,660, filed on Jan. 29, 2010.

(51) Int. Cl.
*A47B 57/00* (2006.01)

(52) U.S. Cl.
USPC .......................... 108/7; 108/50.02; 312/208.1

(58) Field of Classification Search
USPC ............. 108/2, 5–7, 9, 25, 50.01, 50.02, 140, 108/141, 102, 106, 152, 149; 312/223.3, 312/233.231, 208.1, 7.2, 300, 302, 303, 312/330.1; 5/634, 617; 297/354.12, 297/368–370, 423.26; 248/917, 920, 248/281.11, 278.1, 286.1, 287.1, 285.1, 248/295.11, 296.1, 124.1, 125.1
See application file for complete search history.

(56) References Cited

U.S. PATENT DOCUMENTS

| 170,090 | A | * | 11/1875 | Kerr | 5/617 |
| 335,218 | A | * | 2/1886 | Fillebrown | 5/617 |
| 493,303 | A | * | 3/1893 | Seymour | 5/617 |
| 561,880 | A | * | 6/1896 | Fuerstenberg | 248/397 |
| 627,233 | A | * | 6/1899 | Johansen | 5/634 |

(Continued)

FOREIGN PATENT DOCUMENTS

| DE | 3409990 A1 | 7/1984 |
| DE | 29920312 | * 2/2000 |

(Continued)

OTHER PUBLICATIONS

Workrite Ergonomics, www.workriteergo.com/products/platforms. asp, 2 pgs.

(Continued)

*Primary Examiner* — Janet M Wilkens
(74) *Attorney, Agent, or Firm* — Dennis J. Williamson; Moore & Van Allen PLLC (57) ABSTRACT

A work station comprises a work platform that may be mounted on a movable carriage. The work platform may support a keyboard tray on a drawer where the drawer may be moved between a retracted position and an extended position. The tray is mounted for pivoting motion in a first direction and a second direction between a lowered position and a raised position. A gear is operatively connected to the tray such that rotation of the tray causes rotation of the gear. A pawl is biased into engagement with the gear to prevent movement of the tray in the second direction to lock the tray in an angular position when the tray is moved in the first direction. A latch disengages the pawl from the gear when the tray reaches the fully raised position to allow the tray to move in the second direction to the lowered position.

20 Claims, 8 Drawing Sheets

(56) References Cited

U.S. PATENT DOCUMENTS

| | | | |
|---|---|---|---|
| 743,344 A * | 11/1903 | Souder et al. | 5/617 |
| 838,697 A * | 12/1906 | Donaldson et al. | 5/617 |
| 867,647 A * | 10/1907 | Elbert | 5/617 |
| 1,121,713 A * | 12/1914 | Cogger | 108/9 |
| 1,730,028 A | 10/1928 | Ball | |
| 2,016,571 A * | 10/1935 | Barrett | 312/313 |
| 2,668,093 A * | 2/1954 | Bargen | 312/316 |
| 2,931,685 A * | 4/1960 | Myra | 312/196 |
| 3,862,734 A | 1/1975 | Buchin et al. | |
| 3,999,733 A | 12/1976 | Harder, Jr. et al. | |
| 4,071,216 A | 1/1978 | Einhorn | |
| 4,516,751 A | 5/1985 | Westbrook | |
| 4,616,798 A | 10/1986 | Smeenge et al. | |
| 4,693,444 A * | 9/1987 | Williams et al. | 248/653 |
| 4,836,478 A | 6/1989 | Sweere | |
| 4,907,773 A | 3/1990 | Menchetti et al. | |
| 5,005,669 A * | 4/1991 | Umebara et al. | 186/61 |
| 5,007,608 A | 4/1991 | Carroll, Jr. | |
| 5,108,063 A * | 4/1992 | Koerber et al. | 248/284.1 |
| 5,240,215 A | 8/1993 | Moore | |
| 5,397,168 A * | 3/1995 | Hand | 297/356 |
| 5,487,525 A | 1/1996 | Drabczyk et al. | |
| 5,555,819 A * | 9/1996 | Lochridge | 108/9 |
| 5,572,933 A * | 11/1996 | Thompson | 108/7 |
| 5,630,566 A | 5/1997 | Case | |
| 5,632,462 A | 5/1997 | Kallas | |
| 5,655,743 A | 8/1997 | Gillis | |
| 5,738,316 A | 4/1998 | Sweere et al. | |
| 5,743,503 A | 4/1998 | Voeller et al. | |
| 5,771,814 A * | 6/1998 | Clausen | 108/93 |
| 5,791,623 A | 8/1998 | Louridas | |
| 5,797,568 A | 8/1998 | Canton Gongora et al. | |
| 5,842,672 A | 12/1998 | Sweere et al. | |
| 5,848,773 A | 12/1998 | Bourassa | |
| 5,876,008 A | 3/1999 | Sweere et al. | |
| D412,161 S | 7/1999 | Theis et al. | |
| 5,918,841 A | 7/1999 | Sweere et al. | |
| 5,924,665 A | 7/1999 | Sweere et al. | |
| D413,110 S | 8/1999 | Sweere et al. | |
| 5,944,896 A | 8/1999 | Landesman et al. | |
| 5,947,429 A | 9/1999 | Sweere et al. | |
| 5,967,479 A | 10/1999 | Sweere et al. | |
| 5,992,809 A | 11/1999 | Sweere et al. | |
| 6,012,693 A | 1/2000 | Voeller et al. | |
| 6,015,120 A | 1/2000 | Sweere et al. | |
| 6,019,332 A | 2/2000 | Sweere et al. | |
| D423,745 S | 4/2000 | Theis et al. | |
| 6,098,935 A | 8/2000 | Kaplan et al. | |
| D431,736 S | 10/2000 | O'Brien et al. | |
| 6,169,655 B1 * | 1/2001 | Helot | 361/679.44 |
| 6,189,849 B1 * | 2/2001 | Sweere et al. | 248/286.1 |
| 6,233,791 B1 | 5/2001 | Theis | |
| D450,903 S | 11/2001 | Wacker et al. | |
| 6,354,549 B2 | 3/2002 | Sweere et al. | |
| D455,916 S | 4/2002 | Fluhrer et al. | |
| 6,367,756 B1 | 4/2002 | Wang | |
| 6,380,484 B1 | 4/2002 | Theis et al. | |
| 6,419,196 B1 | 7/2002 | Sweere et al. | |
| 6,581,887 B2 | 6/2003 | Lapidez | |
| D477,325 S | 7/2003 | Theis et al. | |
| D477,606 S | 7/2003 | Theis et al. | |
| 6,709,058 B1 | 3/2004 | Diffrient | |
| 6,712,008 B1 | 3/2004 | Habenicht et al. | |
| 6,752,363 B2 | 6/2004 | Boele | |
| 6,863,252 B2 | 3/2005 | Bosson | |
| 6,883,764 B1 | 4/2005 | Mileos et al. | |
| 6,959,965 B2 | 11/2005 | Diffrient | |
| 6,994,306 B1 | 2/2006 | Sweere et al. | |
| 7,004,438 B2 | 2/2006 | Lin | |
| 7,032,870 B2 | 4/2006 | Sweere et al. | |
| 7,063,296 B2 | 6/2006 | Williams | |
| 7,147,190 B2 | 12/2006 | Welles et al. | |
| 7,152,488 B2 * | 12/2006 | Hedrich et al. | 73/849 |
| D535,432 S | 1/2007 | Diffrient | |
| D537,323 S | 2/2007 | Saez | |
| 7,178,469 B2 * | 2/2007 | Goza | 108/50.01 |
| 7,188,813 B2 | 3/2007 | Kollar | |
| 7,195,213 B2 | 3/2007 | Weatherly | |
| 7,252,277 B2 | 8/2007 | Sweere et al. | |
| 7,303,173 B2 | 12/2007 | Mileos | |
| D584,908 S | 1/2009 | Diffrient | |
| 7,472,458 B2 | 1/2009 | Oddsen, Jr. | |
| 7,475,946 B2 | 1/2009 | Diffrient | |
| 7,481,170 B2 | 1/2009 | Sommerfield | |
| 7,487,940 B2 | 2/2009 | Saez et al. | |
| 7,523,905 B2 | 4/2009 | Timm et al. | |
| 7,568,774 B1 * | 8/2009 | Jannetides | 312/223.3 |
| 7,828,253 B2 | 11/2010 | Meyer | |
| 8,109,527 B2 | 2/2012 | Bustle et al. | |
| 2002/0175254 A1 | 11/2002 | Lee | |
| 2003/0001057 A1 | 1/2003 | Sweere et al. | |
| 2004/0251388 A1 | 12/2004 | Williams | |
| 2005/0288571 A1 | 12/2005 | Perkins et al. | |
| 2007/0259554 A1 | 11/2007 | Lindblad et al. | |
| 2007/0295870 A1 | 12/2007 | Peterson et al. | |
| 2008/0026892 A1 | 1/2008 | Asamarai et al. | |
| 2008/0142660 A1 | 6/2008 | Goldberg et al. | |
| 2008/0168930 A1 | 7/2008 | Calero | |
| 2008/0258029 A1 | 10/2008 | Zhang | |
| 2009/0212518 A1 | 8/2009 | Bustle et al. | |
| 2010/0148647 A1 * | 6/2010 | Burgess et al. | 312/327 |
| 2011/0235249 A1 * | 9/2011 | Bustle et al. | 361/679.01 |
| 2012/0261541 A1 * | 10/2012 | Lai | 248/346.5 |

FOREIGN PATENT DOCUMENTS

| | | | |
|---|---|---|---|
| FR | 2783142 A1 | 3/2000 | |
| GB | 2285911 A | 8/1995 | |
| JP | 09054631 | * | 2/1997 |
| WO | 2006078961 A2 | 6/2006 | |

OTHER PUBLICATIONS

Ergotron Products, www.ergotron.com/Products/tabid/65/FID/75/language/en-US/default.aspx, 4 pgs.

Humanscale Keyboard Systems, www.humanscale.com, 5 pgs.

* cited by examiner

KEYBOARD TRAY TILT

This application claims benefit of priority under 35 U.S.C. §119(e) to the filing date of to U.S. Provisional Application No. 61/299,660, as filed on Jan. 29, 2010, which is incorporated herein by reference in its entirety.

BACKGROUND

The invention relates to work stations for supporting display monitors and user input devices such as keyboards on a wall or other vertical surface. The work stations are typically mounted to a wall and comprise a support that may be moved by the end user to position the display, keyboard or the like at a desired height. Preferably end users are provided with the ability to adjust the angle of inclination of the keyboard to provide proper ergonomics for the individual end user.

SUMMARY OF THE INVENTION

The work station may comprise a work platform where the work platform is mounted on a movable carriage and the movable carriage is mounted for vertical movement relative to a support. The support may be attached to a swing arm at a vertical pivot and the swing arm may be attached to a mounting structure at a second vertical pivot. The work platform may support a tray on a drawer where the drawer may be moved between a retracted position where the drawer is located below the work surface and an extended position where the drawer is extended from below the work surface. A separate mouse platform may be supported by the drawer. The tray may be mounted to the drawer such that the angle of inclination of the tray relative to the drawer may be changed. The work platform may comprise a work surface that occupies a substantially horizontal orientation. A monitor may be mounted on the movable carriage.

The tray supports a keyboard and is mounted for pivoting motion in a first direction and a second direction between a lowered position and a raised position. A gear is operatively connected to the tray such that rotation of the tray causes rotation of the gear. A pawl is biased into engagement with the gear to prevent movement of the tray in the second direction to lock the tray in an angular position when the tray is moved in the first direction. A latch disengages the pawl from the gear when the tray reaches the fully raised position to allow the tray to move in the second direction to the lowered position.

The gear may be operatively connected to the tray by a link pivotably connected to the gear and the tray. A second gear may be provided that rotates with the gear and that is engaged by the pawl. The latch may comprise a pivoting member that is mounted for pivoting movement such that the latch may move relative to the gear. The latch may further comprise a slot that receives a pin that is fixed to the gear. The slot may be dimensioned such that when the tray is in the lowered position the pin is located at a rear end of the slot and the pawl is engaged with the gear. The latch may comprise a notch for receiving the pawl. The rotation of the gear may cause the pin to move in the slot toward a front end of the slot. When the tray reaches the raised position the pin may contact the slot such that the latch is rotated with the gear until a cam surface on the latch disengages the pawl from the gear.

DETAILED DESCRIPTION OF EMBODIMENTS OF THE INVENTION

The workstation described herein uses a keyboard tray tilt mechanism that can adjust the angle of inclination of a keyboard and that securely holds the keyboard at the desired angle of inclination. The keyboard tray tilt mechanism also operates independently of the mouse platform and other accessories such that adjustments in the angle of inclination of the keyboard tray do not affect the position or useablility of other accessories. The keyboard tray tilt mechanism is controlled by the end user, enabling the workstation to be easily adjusted when desired. Fast and easy adjustment of the angle of inclination of the keyboard facilitates proper ergonomics for a broad range of end users. The work station has particular application in medical environments such as hospitals or the like.

Referring to FIGS. 1 through 4 the work station is shown generally at 1 and uses a dual swing arm comprising a first upper swing arm 2 and a second lower swing arm 4 attached to a support 6 at vertical pivots such that the support 6 may pivot relative to arms 2 and 4 about axis A-A. The arms 2 and 4 are also attached to a mounting structure 12 at vertical pivots 14 and 16 such that the arms 2 and 4 may pivot relative to the mounting structure 12 about axis B-B. In the illustrated embodiment the mounting structure 12 is a reinforced post, bracket or plate that is adapted to be attached to a wall or other fixed vertical support by screws or other fasteners. While the illustrated work station is a wall mounted work station, the keyboard tray tilt mechanism may be used with a mobile workstation such as a cart based work station where the support 6 is mounted on or forms a part of a rolling cart.

The dual swing arm arrangement provides vertical and side-to-side motion and improves cable management, stowing, stability, ease of service/maintenance and installation. The wall work station 1 is particularly well suited for healthcare applications such as in a patient room although it may be used in a wide variety of applications. In such a healthcare environment maintaining the range of movement is important for user comfort and healthcare professional-to-patient interaction.

A work platform 10 and a monitor 8 may be mounted on a movable carriage 18 where the carriage 18 may be moved vertically relative to support 6 to adjust the height of the work platform 10 and monitor 8. The work platform 10 may be mounted to carriage 18 on a horizontal pivot axis such that it can be rotated from the illustrated horizontal position to a vertical storage position below the monitor 8. Further, the monitor 8 may be mounted on the movable carriage 18 such that it can be rotated relative to the movable carriage about the x, y and/or z axes to change the viewing angle of the monitor.

The work platform 10 supports a keyboard tray 20 that supports a keyboard. The work platform 10 comprises a work surface 10a that occupies a substantially horizontal orientation when the work platform is in the illustrated deployed position. Providing a substantially horizontal work surface 10a on the work platform 10 allows the work surface 10a to be used as a support for papers, medication and other equipment while simultaneously allowing the user to access the keyboard. The work platform supports keyboard tray 20 where, in one embodiment, the keyboard tray 20 is mounted on a drawer 22 where the drawer may be moved between a retracted position (FIG. 1) where it is located below work surface 10a and an extended deployed position (FIGS. 2, 3 and 4) where it is extended from below the work surface 10a where it may be accessed by a user. The drawer 22 may be supported on runners 24 that are supported by rollers or other anti-friction device that allow the runners to slide into and out of the work platform 10 when the drawer 22 is pushed and pulled between the extended and retracted positions. The work platform 10 may define an enclosed space 26 (FIG. 4) for receiving the drawer 22 and keyboard tray 20.

Figure 1:
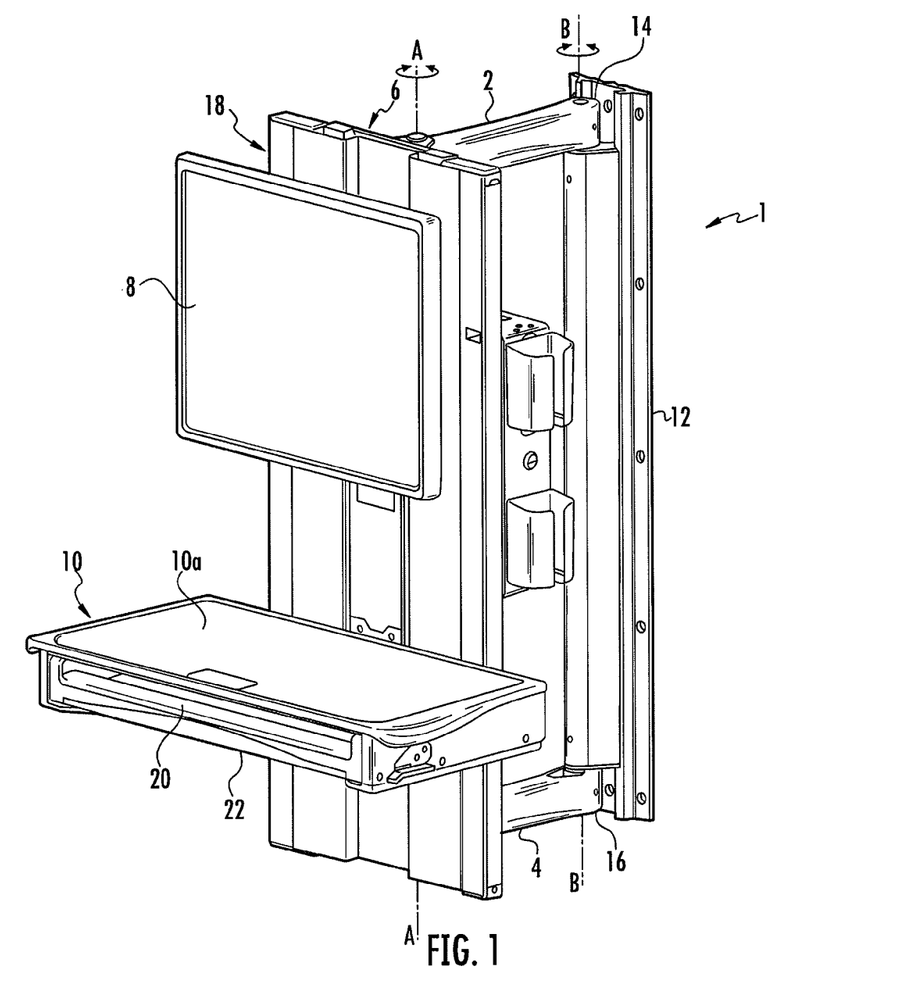
FIG. 1 is a perspective view showing an embodiment of a work station with an embodiment of the keyboard tray tilt mechanism with the keyboard tray in a retracted position.
Figure 2:
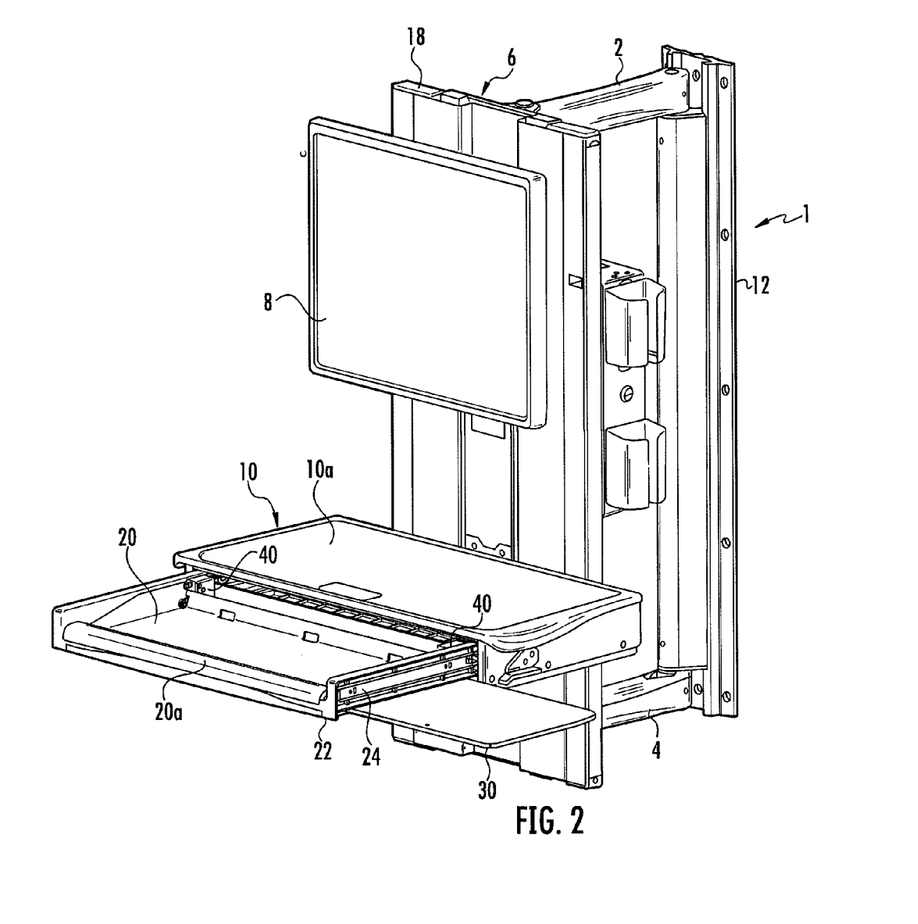
FIG. 2 is a perspective view of the embodiment of the work station of FIG. 1 with the keyboard tray in a deployed position at a first angle.
Figure 3:
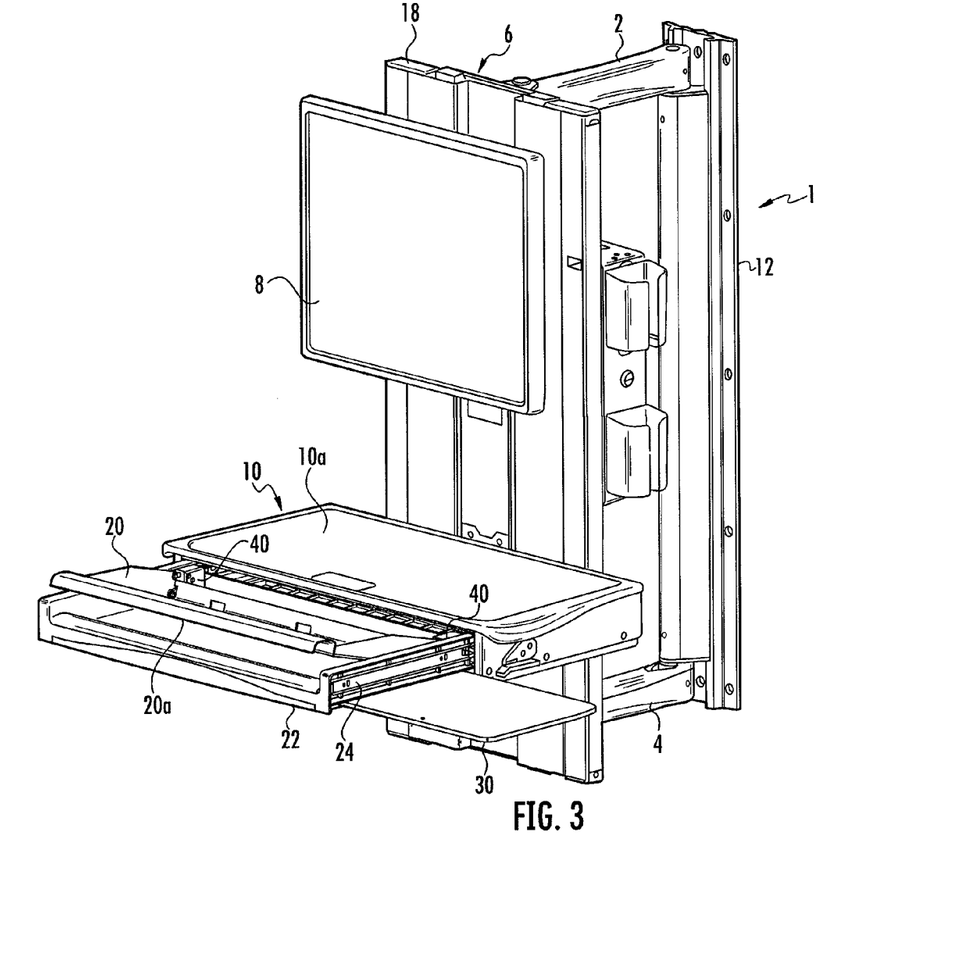
FIG. 3 is a perspective view of the embodiment of the work station of FIG. 1 with the keyboard tray in a deployed position at a second angle.
Figure 4:
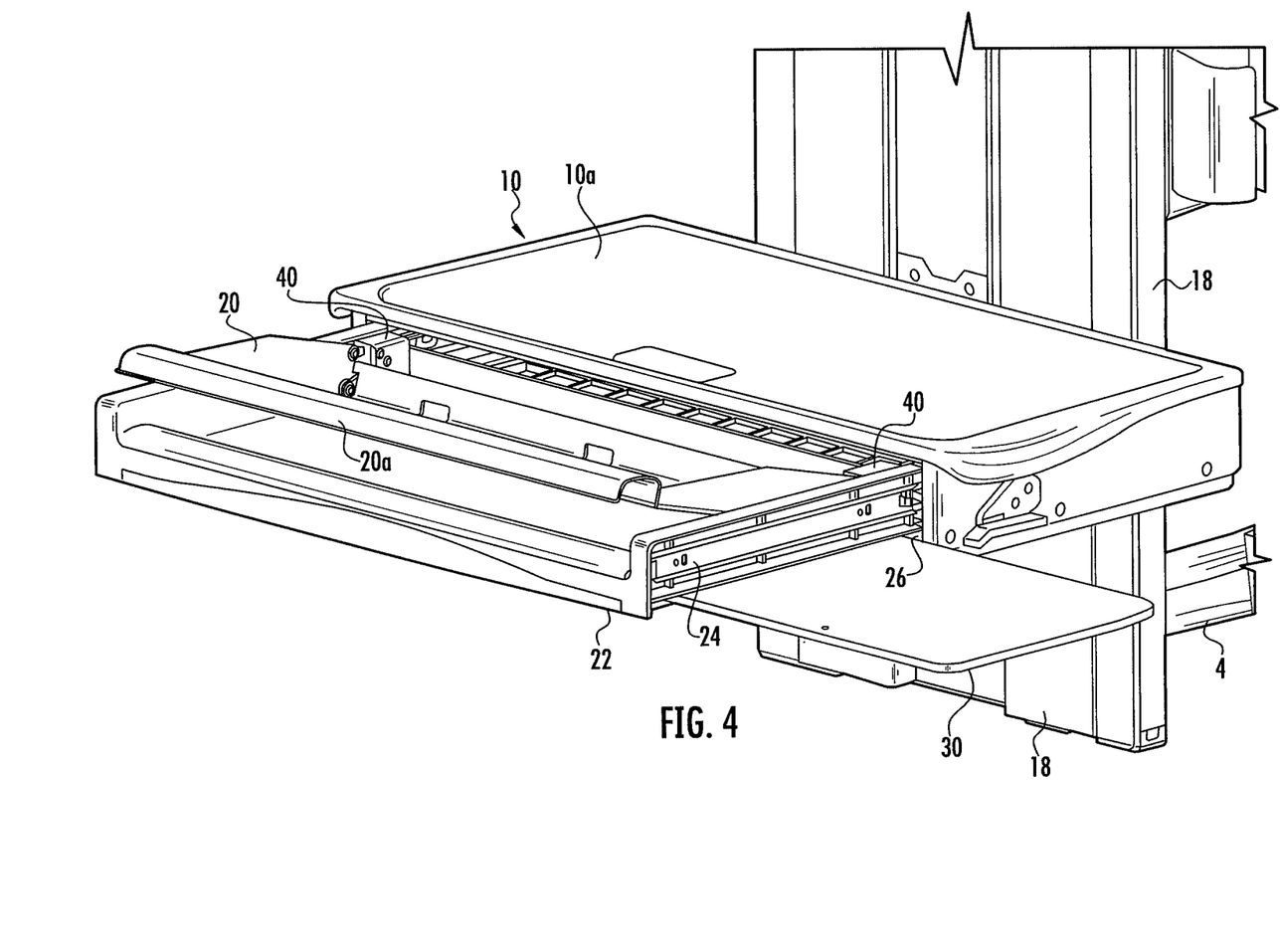
FIG. 4 is a partial front view showing the embodiment of the work station of FIG. 1 in greater detail.
Figure 5:
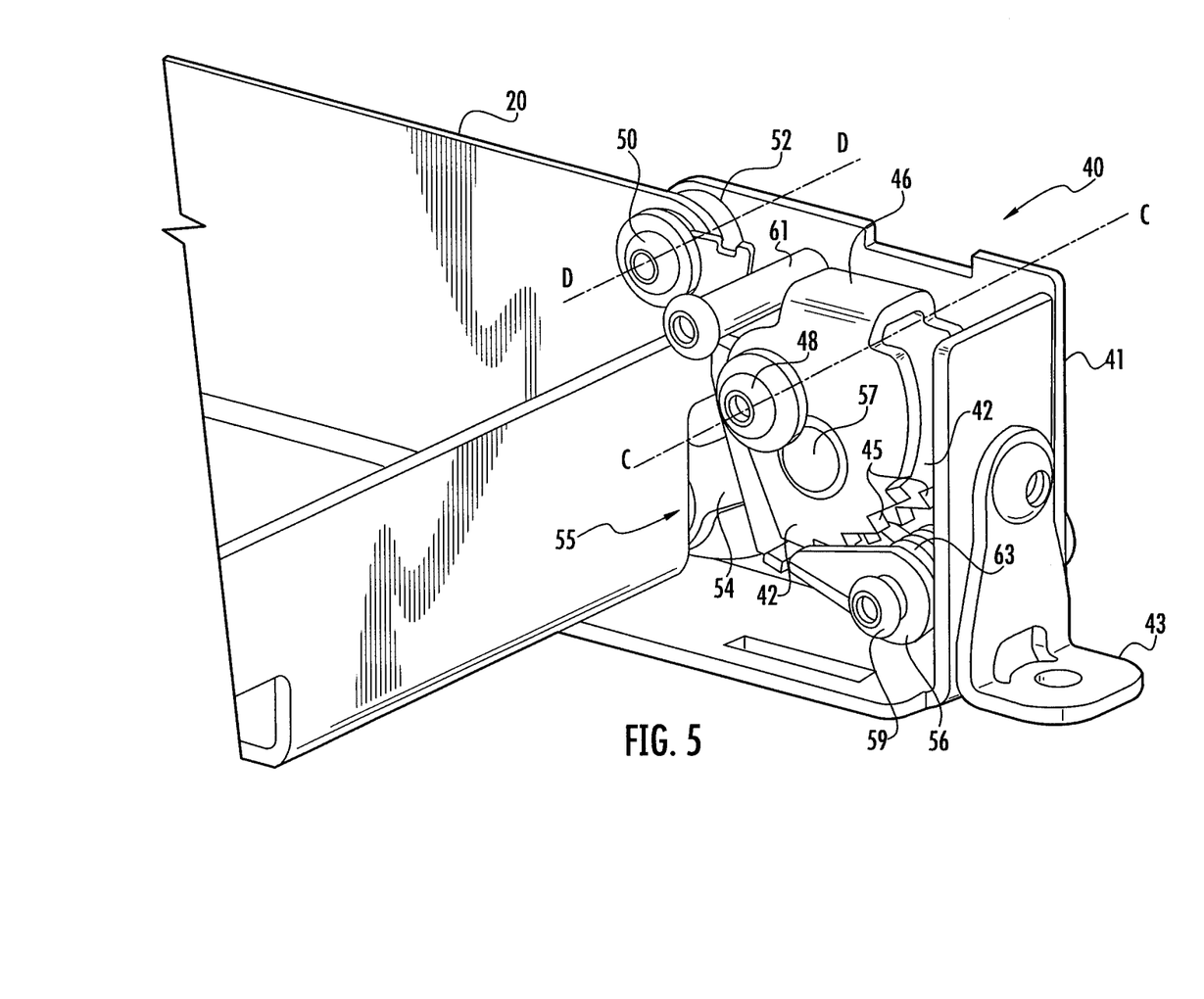
FIG. 5 is a perspective view showing an embodiment of the keyboard tray tilt mechanism used in the embodiment of FIG. 1 with a portion of the cover removed to reveal the internal mechanism.
Figure 6:
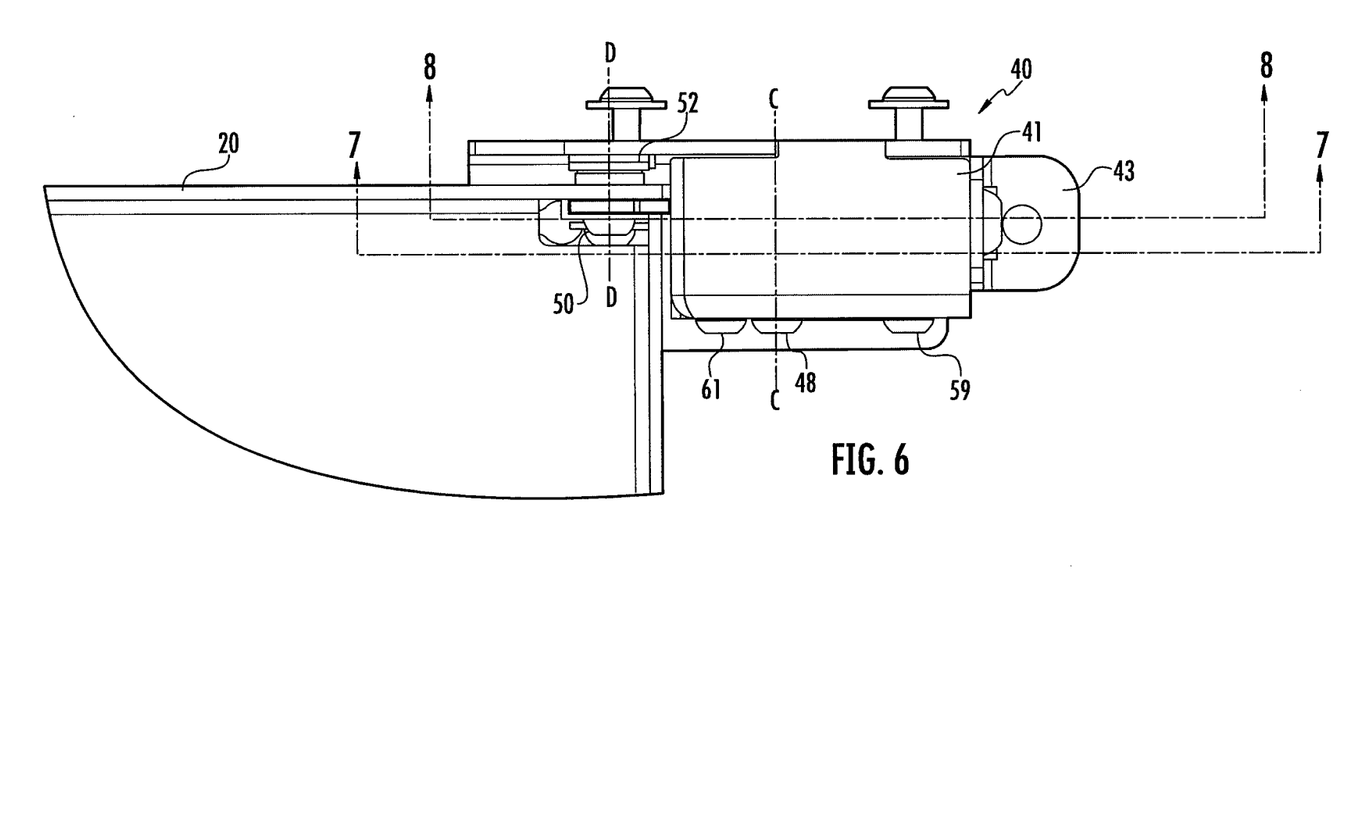
FIG. 6 is a top view showing the keyboard tray tilt mechanism of FIG. 5.

A separate mouse platform 30 may be supported by the drawer 22 such that the mouse platform may be moved between a retracted position where the mouse platform 30 is disposed below or within the drawer 22 and an extended position, as shown in FIGS. 2, 3 and 4, where it may support a mouse. The mouse platform 30 is shown in the drawings extended to the right side of drawer 22, the mouse platform 30 may be extended in the same manner to the left side of the drawer 22. The mouse platform 30 and work surface 10a define surfaces that are separate from the keyboard tray 20 such that adjustment of the angle of inclination of keyboard tray 20 does not affect the orientation or position of these surfaces. Platform 30 may be moved to the retracted position before the drawer 22 is moved to the retracted position of FIG. 1. Mouse platform 30 may be moved to the extended position when the drawer 22 is in the extended position as shown in FIGS. 2, 3 and 4. With known systems, adjusting the keyboard angle may also cause the adjacent mouse support and other accessories to rotate with the keyboard tray with the result being that the mouse and other accessories are not in a proper ergonomic position or are not in a position that is suitable for use. Because the mouse platform 30 and work surface 10a are not part of the tilting keyboard tray, the angle of inclination of the keyboard tray 20 may be changed by the end user without changing the angular orientation or position of the mouse platform 30 or the work surface 10a. As a result, the mouse platform 30 may support a mouse in a substantially horizontal position and the horizontal work surface 10a may support papers, medicine or other user equipment and may be used as a desk by the end user regardless of the angle of keyboard tray 20.

The keyboard tray 20 is mounted to the drawer such that the angle of inclination of the keyboard tray 20, and the keyboard supported by the keyboard tray 20, may be easily changed by the end user to an ergonomically comfortable position. The tilt mechanism of the invention uses a ratchet mechanism 40 located at each of the back corners of keyboard tray 20 that locks the tray 20 at the selected angle of inclination. The user may simply raise the front edge 20a of the keyboard tray 20 to adjust the angle. To reset the angle of the keyboard tray 20 to the initial position, the user lifts the front edge 20a of the tray 20 to the highest elevation which cancels the ratchet mechanism.

The ratchet mechanisms 40 are identical such that one of the ratchet mechanisms will be described in detail with reference to FIGS. 5 through 8. The ratchet mechanism 40 may be mounted in a separate ratchet housing 41 that is in turn mounted in the drawer 22 using flange 43 or it may be mounted directly to drawer 22. The ratchet mechanism 40 comprises a gear assembly comprising a pair of toothed ratchet gears 42 mounted on pin 48 such that the gears 42 pivot together about the rotational axis C-C. In the illustrated embodiment the gears 42 comprise sector gears having teeth 45 where the gears 42 are single component connected by a flange 46.

Tray 20 is mounted on pin 50 for pivoting motion about a second pivot axis D-D such that the tray 20 may pivot relative to the drawer 22 about the pivot axis D-D. Friction washers 52 may be used to inhibit the speed with which the tray 20 may be rotated.

The ratchet gears 42 are connected to tray 20 such that rotation of the drawer 20 about axis D-D results in the simultaneous rotation of gears 42 about the rotational axis C-C. In the illustrated embodiment the gears 42 are connected to tray 20 by link 54 where link 54 is pivoted to gears 42 at pivot 57 and to tray 20 at pivot 55 such that when the tray 20 is raised and rotated in the direction of arrow A the gears 42 are simultaneously rotated in the direction of arrow B (FIGS. 7 and 8).

The ratchet gears 42 and tray 20 are held in the desired angular position by pivoting pawl 56 where pawl 56 is dimensioned to engage both of gears 42. The pawl 56 is mounted on pivot pin 59 such that the pawl 56 may pivot toward and away from gears 42. The pawl 56 terminates in an edge 56a that bears against the surfaces of teeth 45 at an angle so that any backward motion of gears 42 (motion opposite to arrow B) will cause the pawl 56 to jam against the teeth 45 and prevent any further backward motion of gears 42. A spring 63 biases the pawl 56 toward the gears 42 (clockwise as viewed in FIGS. 5, 7 and 8) such that the pawl 56 remains in contact with gears 42. In the illustrated embodiment the ratchet mechanism 40 comprises a pair of gears 42 that are engaged by pawl 56. While the use of two gears 42 provides a more stable ratchet mechanism, a single gear and pawl arrangement may be used.

Figure 7:
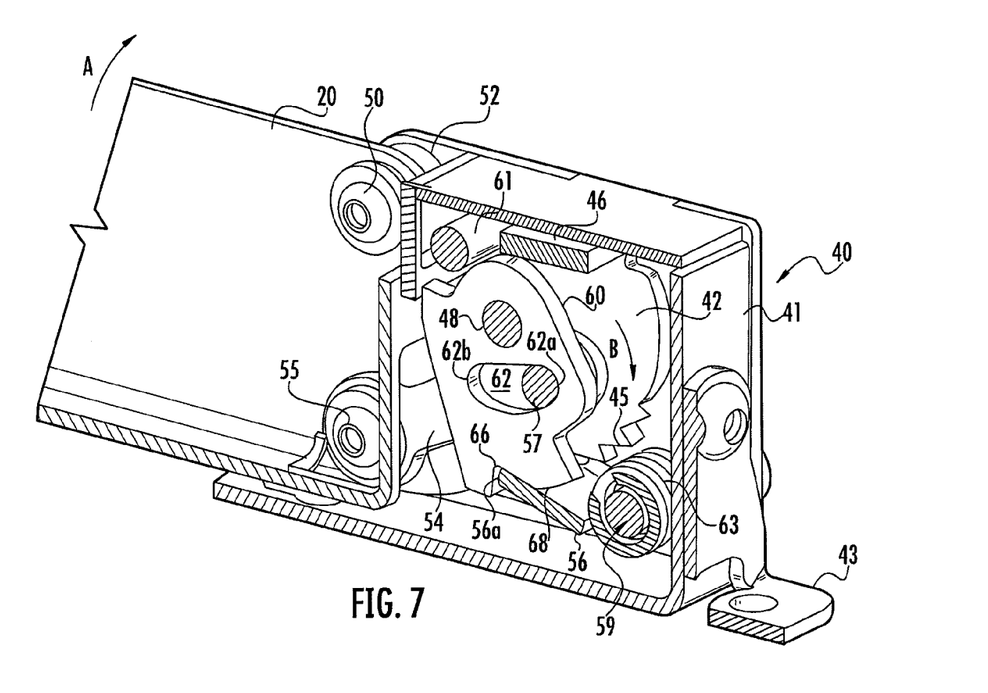
FIG. 7 is a section view taken along line x-x of FIG. 6.
Figure 8:
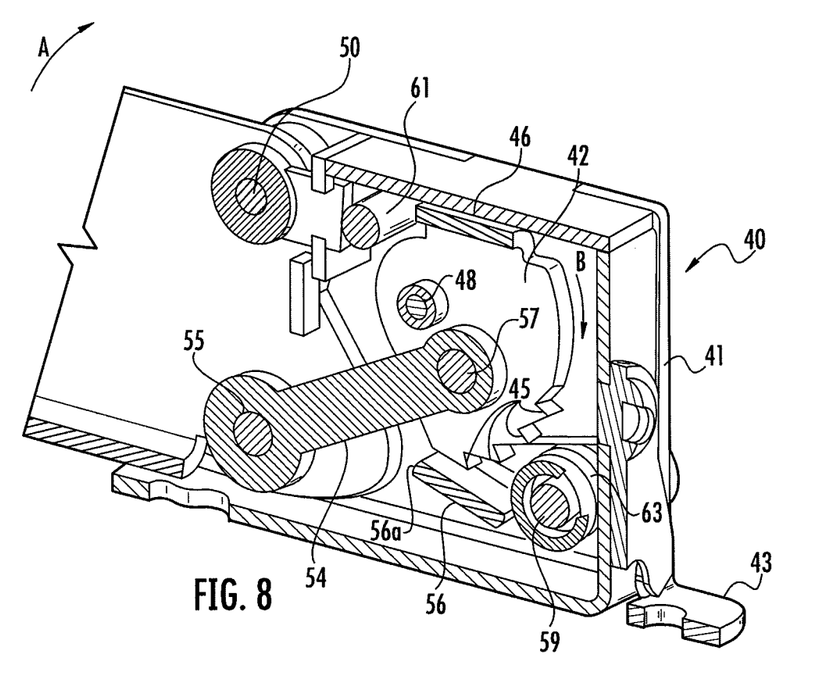
FIG. 8 is a section view taken along line y-y of FIG. 6.

Referring to FIG. 7 a latch 60 is provided for releasing the pawl 56 from engagement with the gears 42 to allow the tray 20 to return to the lowered position of FIG. 2. The latch 60 comprises a pivoting member that engages the pawl 56 to hold the pawl in a disengaged position as will hereinafter be described. The latch 60 is mounted for pivoting movement on pin 48 such that the latch 60 may move relative to the gears 42. The latch 60 comprises a slotted aperture 62 that receives pin 57. Pin 57 is fixed to gears 42 such that when the latch 60 moves relative to gears 42 the pin 57 moves in slot 62. The slot 62 is dimensioned such that when the drawer is in the lower most position (FIGS. 2 and 7) the pin 64 is located at the rear end 62a of the slot 62. In this position the latch 60 is engaged with the pawl 56 such that the pawl 56 engages teeth 45 of the gears 42. The latch 60 comprises a notch or recess 66 for receiving the end of pawl 56 that allows the end 56a of the pawl 56 to move close enough to the gears 42 that the pawl will engage teeth 45.

When the tray 20 is tilted, by the end user lifting the front edge 20a of tray 20, the gears 42 rotate relative to the pawl 56 in the direction of arrow B such that the gear teeth 45 ratchet over the pawl 56. As the gears 42 rotate, pin 57 slides in slot 62 toward the front end 62b of the slot while latch 60 remains stationary. If the user releases the tray the tray is held in the elevated position by the engagement of pawl 56 with the gear teeth 45.

To reset the ratchet mechanism to allow the tray 20 to be lowered, the user rotates the tray 20 by lifting the front edge 20a to its end of travel. As the tray 20 reaches its end of travel, pin 57 strikes the front end 62b of slot 62 such that latch 60 is rotated with gears 42 in the direction of arrow B as the tray 20 is rotated. The engagement of pin 57 with the front end 62b of slot 62 causes the latch 60 to rotate until the cam surface 68 of latch 60 rides on top of pawl 56 and disengages the pawl 56 from teeth 45. Cam surface 68 is configured to push pawl 56 away from and out of engagement with gears 42. Because pawl 56 no longer contacts teeth 45, tray 20 can be rotated to the lowermost position. Latch 60 also strikes stop 61 to stop the rotation of tray 20.

As the tray 20 reaches the lowermost position, the pin 57 strikes the rear end 62a of slot 62 causing the latch 60 to rotate in a direction opposite arrow B such that cam surface 68 rides over the pawl 56 until pawl 56 is urged into notch 66 on latch 60 by spring 63, as shown in FIG. 7. As previously explained, when the pawl 56 is in this position the pawl is biased against gears 42 by the spring 63 such that the tray 20 can again be raised and held in a desired angular position using the ratchet mechanism.

The operation of the device will be described with reference to the figures. The user may tilt the entire work platform 10 to the horizontal position shown in FIG. 1. The drawer 22 may then be pulled out from the work platform 10 to reveal the keyboard and keyboard tray 20 as shown in FIG. 2. If the user wants to adjust the angle of the keyboard tray 20 and keyboard, the user raises the front edge 20a of the tray 20 as shown in FIG. 3. As the front edge 20a of the tray 20 is raised the tray 20 pivots about axis D-D in the direction of arrow A causing the simultaneous rotation of gears 42 about axis C-C in the direction of arrow B. As the gears 42 rotate, the gear teeth 45 slide or ratchet over pawl 56. When the keyboard tray 20 is at the desired angular inclination, the user may release the keyboard tray 20. When the keyboard tray 20 is released, the tray, under the force of gravity, will tend to rotate back down toward drawer 22 in a direction opposite to arrow A. The backward rotation of the tray 20 causes the simultaneous backward rotation of gears 42 in a direction opposite to arrow B. As the gears 42 rotate backward the pawl 56 engages the first adjacent tooth halting backward rotation of the tray 20 and locking the tray in position relative to the drawer 22. The user may use the keyboard in the tilted position and may apply force to the keyboard without inadvertently moving the tray because of the engagement of pawl 52 with gears 42. To further raise the tray 20, the user may raise the front edge 20a of the tray to further tilt the keyboard tray.

To lower the tray the user raises the front edge 20a of the tray 20 to its highest elevation relative to drawer 22 to thereby rotate tray 20 to its fullest extent in the direction of arrow A. In this position camming surface 68 of latch 60 contacts pawl 56 and pushes the pawl 56 away from gears 42 such that the pawl 56 is in a disengaged position where it is no longer contacts teeth 45. While pawl 56 is held in the disengaged position, tray 20 may be rotated in a direction opposite to arrow A back to the starting position where the front edge 20a of the tray 20 is in the completely lowered position of FIG. 1. When the tray 20 reaches the completely lowered position, pin 57 contacts the rear end 62a of slot 62 to move the camming surface 68 of latch 60 out of engagement with pawl 56. The pawl 56 returns to its engaged position in notch 66 under the force exerted by spring 63 where it is positioned to engage the teeth 45. The tray 20 may then be raised as previously described to adjust the angle of the tray 20 to any desired angular inclination.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. An apparatus comprising:
   a tray for supporting a keyboard mounted to move in a pivoting motion in a first direction and a second direction between a lowered position and a raised position;
   a mouse platform mounted at an orientation where the pivoting motion of the tray does not change the orientation;
   a gear operatively connected to the tray by a link pivotably connected to the gear and to the tray such that rotation of the tray causes rotation of the gear;
   a pawl biased into engagement with the gear to prevent movement of the tray in the second direction to lock the tray in an angular position when the tray is moved in the first direction;
   a latch for disengaging the pawl from the gear.

2. The apparatus of claim 1 wherein the tray is mounted to a work platform that forms part of a work station.

3. The apparatus of claim 2 wherein the work platform is mounted on a movable carriage, the movable carriage being mounted on a support for vertical movement relative to the support, the support being attached to a swing arm at a vertical pivot and the swing arm being attached to a mounting structure at a second vertical pivot.

4. The apparatus of claim 2 wherein the work platform supports the tray on a drawer.

5. The apparatus of claim 3 further comprising a monitor mounted on the movable carriage.

6. The apparatus of claim 4 where the work platform comprises a work surface and the drawer is movable between a retracted position where the drawer is located below the work surface and an extended position where the drawer is extended from below the work surface.

7. The apparatus of claim 4 wherein the mouse platform is supported on the drawer.

8. The apparatus of claim 4 wherein tray is mounted to the drawer such that the angle of inclination of the tray relative to the drawer may be changed.

9. The apparatus of claim 2 wherein the work platform comprises a work surface that occupies a substantially horizontal orientation where the pivoting motion of the tray does not change the substantially horizontal orientation.

10. The apparatus of claim 1 further comprising a second gear that rotates with the gear and that is engaged by the pawl.

11. The apparatus of claim 1 wherein the latch that is mounted for pivoting movement such that the latch may move relative to the gear.

12. The apparatus of claim 11 wherein the latch further comprises a slot that receives a pin that is fixed to the gear.

13. The apparatus of claim 12 wherein the slot is dimensioned such that when the tray is in the lowered position the pin is located at a rear end of the slot and the pawl is engaged with the gear.

14. The apparatus of claim 13 wherein the latch comprises a notch for receiving the pawl.

15. The apparatus of claim 12 wherein rotation of the gear causes the pin to move in the slot toward a front end of the slot.

16. The apparatus of claim 12 wherein when the tray reaches the raised position the pin contacts the slot such that the latch is rotated with the gear until a cam surface on the latch disengages the pawl from the gear.

17. The apparatus of claim 1 wherein the latch disengages the pawl from the gear when the tray reaches the fully raised position to allow the tray to move in the second direction to the lowered position.

18. An apparatus comprising:
- a tray for supporting a keyboard mounted to move in a pivoting motion in a first direction and a second direction between a lowered position and a raised position;
- a mouse platform mounted at an orientation where the pivoting motion of the tray does not change the orientation;
- a first gear and a second gear that rotates with the first gear operatively connected to the tray such that rotation of the tray causes rotation of the first gear and the second gear;
- a pawl biased into engagement with the first gear and the second gear to prevent movement of the tray in the second direction to lock the tray in an angular position when the tray is moved in the first direction;
- a latch for disengaging the pawl from the first gear and the second gear.

19. An apparatus comprising:
- a tray for supporting a keyboard mounted to move in a pivoting motion in a first direction and a second direction between a lowered position and a raised position;
- a mouse platform mounted at an orientation where the pivoting motion of the tray does not change the orientation;
- a gear operatively connected to the tray such that rotation of the tray causes rotation of the gear;
- a pawl biased into engagement with the gear to prevent movement of the tray in the second direction to lock the tray in an angular position when the tray is moved in the first direction;
- a latch for disengaging the pawl from the gear, the latch mounted for pivoting movement such that the latch may move relative to the gear, wherein the latch further comprises a slot that receives a pin that is fixed to the gear.

20. An apparatus comprising:
- a first swing arm and a second swing arm attached to a mounting structure at a first vertical axis such that the first swing arm and the second swing arm are pivotable about the first axis, the first swing arm and the second swing arm being attached to a support at a second vertical axis such that the support is pivotable relative to the first swing arm and the second swing arm about the second axis;
- a tray mounted on the support for supporting a keyboard, the tray comprising a back edge disposed adjacent the support and a front edge disposed farther from the support than the back edge, the tray having a pivot axis disposed along the back edge, the tray mounted to move in a pivoting motion about the pivot axis such that the front edge is movable in a first direction and a second direction between a lowered position and a raised position;
- a mouse platform mounted at an orientation where the pivoting motion of the tray does not change the orientation;
- a gear operatively connected to the tray such that rotation of the tray causes rotation of the gear;
- a pawl biased into engagement with the gear to prevent movement of the tray in the second direction to lock the tray in an angular position when the tray is moved in the first direction;
- a latch for disengaging the pawl from the gear.

* * * * *

UNITED STATES PATENT AND TRADEMARK OFFICE
CERTIFICATE OF CORRECTION

| | | |
|---|---|---|
| PATENT NO. | : 8,616,136 B2 | Page 1 of 1 |
| APPLICATION NO. | : 13/016377 | |
| DATED | : December 31, 2013 | |
| INVENTOR(S) | : Roddy Burgess, Jacob Connelly and Robert Grant McRorie | |

It is certified that error appears in the above-identified patent and that said Letters Patent is hereby corrected as shown below:

In the Claims:

In column 6, claim 11, please change line 55 to read:

The apparatus of claim 1 wherein the latch is

Signed and Sealed this
Eighteenth Day of March, 2014

Michelle K. Lee
*Deputy Director of the United States Patent and Trademark Office*